US009742742B1

(12) United States Patent
Monk

(10) Patent No.: US 9,742,742 B1
(45) Date of Patent: Aug. 22, 2017

(54) SECURE DATA TRANSFER SYSTEM AND METHOD

(71) Applicant: VAULTARA LLC, Excelsior, MN (US)

(72) Inventor: David Monk, Mission Viejo, CA (US)

(73) Assignee: Vaultara LLC, Excelsior, MN (US)

( * ) Notice: Subject to any disclaimer, the term of this patent is extended or adjusted under 35 U.S.C. 154(b) by 0 days.

(21) Appl. No.: 15/355,651

(22) Filed: Nov. 18, 2016

(51) Int. Cl.
H04L 29/06 (2006.01)
H04L 9/32 (2006.01)

(52) U.S. Cl.
CPC ........ *H04L 63/0428* (2013.01); *H04L 9/3228* (2013.01); *H04L 9/3263* (2013.01); *H04L 63/123* (2013.01)

(58) Field of Classification Search
CPC .. H04L 63/0428; H04L 63/123; H04L 9/3263
See application file for complete search history.

(56) References Cited

U.S. PATENT DOCUMENTS

| 6,874,085 | B1 | 3/2005 | Koo et al. |
| 7,028,185 | B2 | 4/2006 | Wheeler et al. |
| 7,181,017 | B1 | 2/2007 | Nagel et al. |
| 7,379,605 | B1* | 5/2008 | Ticsa ................... G06F 19/321 382/232 |
| 7,587,368 | B2 | 9/2009 | Felsher |
| 7,974,924 | B2 | 7/2011 | Holla et al. |
| 8,065,166 | B2* | 11/2011 | Maresh ................. G06F 19/321 705/3 |
| 8,271,802 | B2 | 9/2012 | Orsini et al. |
| 8,566,247 | B1 | 10/2013 | Nagel et al. |
| 8,577,696 | B2 | 11/2013 | Fram et al. |
| 9,223,995 | B1* | 12/2015 | Lavinio ................ G06F 21/606 |
| 2001/0049610 | A1 | 12/2001 | Hazumi |
| 2001/0051881 | A1 | 12/2001 | Filler |
| 2002/0016718 | A1 | 2/2002 | Rothschild et al. |
| 2002/0124177 | A1 | 9/2002 | Harper et al. |
| 2003/0074564 | A1 | 4/2003 | Peterson |
| 2006/0230072 | A1 | 10/2006 | Partovi et al. |
| 2006/0247952 | A1* | 11/2006 | Muraca ................ G06F 19/322 705/3 |
| 2007/0027715 | A1* | 2/2007 | Gropper ............... G06F 19/322 705/2 |
| 2007/0232885 | A1* | 10/2007 | Cook ................... G06F 19/321 600/407 |
| 2008/0021834 | A1 | 1/2008 | Holla et al. |
| 2009/0083544 | A1 | 3/2009 | Scholnick et al. |
| 2009/0103789 | A1 | 4/2009 | Danner et al. |

(Continued)

Primary Examiner — Matthew Smithers
(74) Attorney, Agent, or Firm — Thomas J. Nikolai; Nikolai & Mersereau, P.A.

(57) ABSTRACT

Secure transfer of electronic files containing confidential information is achieved by selecting and copying files to be transferred to an intended recipient and, prior to transfer, subjecting the copies to consolidation, compression, chunking and encryption. Decryption, unchunking and decompression of the transferred files can only be performed by a recipient who has also received a verification code, an encrypted and password protected sector file, and an encrypted password file. Decryption of the password file requires a private certificate available only to the intended recipient. Decryption of the other files requires a one-time random transaction password contained in the password file.

12 Claims, 3 Drawing Sheets

(56) References Cited

U.S. PATENT DOCUMENTS

| | | |
|---|---|---|
| 2009/0164253 A1 | 6/2009 | Lyshkow |
| 2011/0110568 A1 | 5/2011 | Vesper et al. |
| 2012/0047365 A1* | 2/2012 | Mercer ................ G06F 21/606 |
| | | 713/168 |
| 2012/0072723 A1 | 3/2012 | Orsini et al. |
| 2013/0013931 A1 | 1/2013 | O'Hare et al. |
| 2013/0060579 A1* | 3/2013 | Yu ......................... G06Q 10/06 |
| | | 705/3 |
| 2013/0317851 A1 | 11/2013 | Maresh et al. |
| 2014/0142982 A1* | 5/2014 | Janssens ............... G06F 19/321 |
| | | 705/3 |
| 2014/0237614 A1* | 8/2014 | Irvine ................. G06F 21/6218 |
| | | 726/26 |
| 2016/0147945 A1* | 5/2016 | MacCarthy ........... G06F 19/322 |
| | | 705/51 |
| 2017/0098046 A1* | 4/2017 | Coughlan ............. G06F 19/328 |

* cited by examiner

SECURE DATA TRANSFER SYSTEM AND METHOD

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to the secure transfer of confidential records between two facilities remote from each other. More specifically, the invention relates to the secure transmission of electronic confidential records between a computer system at a first transferring facility and a computer system at a second receiving facility.

II. Related Art

For centuries, there has been a need to securely transfer confidential records in a secure fashion and steps have been taken to ensure against unauthorized personnel from gaining access. Trusted couriers have been used to transmit physical copies of documents containing confidential information. Most countries adopted laws long ago designed to protect the confidentiality of documents delivered by postal services. With the emergence of telegraphy and telephone systems (and the use of telephone systems for facsimile transmission), laws were passed and steps were taken to prevent tapping of transmission lines and switches. Various coding and decoding schemes have been employed when radio, telephone or computer networks are used to transfer sensitive or confidential data. Still, breaches have occurred. Such breaches have risen to an epidemic level with e-mail transmissions because copies reside on so many computers connected to the internet. While some messages and documents are encrypted prior to transfer via the internet, current encryption methods have proven to be inadequate. A relatively detailed summary of prior art security measures is found in the "BACKGROUND OF THE INVENTION" section of U.S. Pat. No. 7,587,368 granted on Sep. 8, 2009 to Felsher, hereby fully incorporated by reference.

There continues to be a real need for a reliable and efficient mechanism enabling secure electronic transmission of confidential materials. This need exists for the military, for other government agencies, and for many businesses. This need is particularly acute in the medical industry. In the medical industry, confidential patients' records must be routinely transferred between a hospitals or other diagnostic centers and clinics where treating physicians work. Further, prescription information linked to specific patients is by law confidential and is routinely transferred electronically between medical clinics and pharmacies. Such confidential information is often transmitted in an unsecure fashion. When security measures are taken, they are often cumbersome to use or easily circumvented. Thus, there continues to be a real need for a secure and highly automated method and apparatus for electronic transmission of confidential medical information from a first transmitting facility to a second receiving facility.

SUMMARY OF THE INVENTION

The present invention relates to equipment and methods for securely transferring confidential electronic records from a source facility to a destination facility using multiple layers of protection to make it highly unlikely that the records can be intercepted and, even if intercepted, read by unauthorized personnel.

Such an apparatus comprises a first computer system located at a source facility. The first computer system comprises a console, local storage devices and a portal. One or more of the storage devices contain various records maintained by the source facility, including confidential records maintained by the source facility. The records maintained on this set of local storage devices are generally available to authorized personnel located at the source facility, but not to others.

The console of the first computer system is adapted to perform various functions. These include: (i) restricting access to confidential records to authorized personnel, (ii) selecting confidential records to be sent from the source facility to the destination facility, (iii) selecting parameters to be employed to secure and control the transfer of the selected confidential records, (iv) creating a first copy of selected confidential records and storing the first copy on a separate second set of local storage devices. The console is also isolated so that it cannot be accessed from a computer or other device outside of the source facility via the internet or any other means. As such, the console cannot be used as a vehicle for hackers or others outside of the source facility to gain unauthorized access to the confidential records stored on the first set of local storage devices.

The portal can communicate via the internet. However, the portal cannot access records stored on the first set of local storage devices. The portal can only access the copies stored on the separate second set of local storage devices. These are the records identified using the console and intended for delivery to the computer system of the destination facility.

To prepare the selected records for secure delivery to the destination facility, the first computer system further processes the copy of the selected records. Specifically, the first computer system compresses the first copy of the selected records into a single encrypted binary file using a one-time random transaction password having a specified bit size. The first computer system then splits the single encrypted binary file into a plurality of encrypted chunked files and performs a checksum for each of said plurality of encrypted chunked files. To enable the chunked files to be reassembled, the first computer system also creates an encrypted sector file using the one-time random transaction password. The encrypted sector file contains the password bit size, a transaction protocol, a transaction type, an address of at least one of the portal and the console, the name of each encrypted chunked file, and the checksum of each encrypted chunked file. The first computer system also creates an encrypted password file using a public key and containing the one-time random transaction password. Only after all the foregoing processing steps have been performed will the computer system of the source facility perform the transfer to the destination facility. Actual delivery is performed by the portal which is adapted to transmit the encrypted chunk files, the encrypted sector files, and the encrypted password file over a secure transport mechanism such as a TCP/IP transport mechanism.

A second computer system located at a destination facility is adapted to receive each of the encrypted chunked files, the encrypted sector file and the encrypted password file. The second computer system is further adapted to obtain the private key and verification codes needed to decrypt the password file. Until the second computer system located at the destination facility has these items on hand, even it is incapable of accessing the confidential records being transmitted. Likewise, any one intercepting some, but not all the files, will find useless that which has been intercepted. Even if all the files are intercepted, they would still be useless without the private key and the verification codes. The public key is supplied by a third party who does not have access to either the transmitted files themselves or the private key(s).

Once the second computer system of the destination facility has the materials on hand, the materials are processed to reassemble the confidential records. The second computer system of the destination facility decrypts the password file using a private key (certificate). The second computer system then decrypts the sector file and encrypted chunked files using the one-time random transaction password and the verification code(s). The second computer system next performs a checksum on the chunked files and compares the checksums for the chunked files to the checksums in the sector file to ensure the second computer system has all the necessary chunked files and to ensure that they haven't changed during transit. If any are missing, it sends a request for the missing files back to the portal. Once all the chunked files are on hand, the second computer system combines the chunked files into a single encrypted binary file, decrypts the single encrypted binary file using the one-time random transaction password, and decompresses the decrypted binary file back to the same format revealing to the second computer system the confidential information stored therein.

Most implementations of the invention will include a cloud-based apparatus adapted to provide the public certificate for the password file and the verification each referenced above.

DETAILED DESCRIPTION

Figure 1:
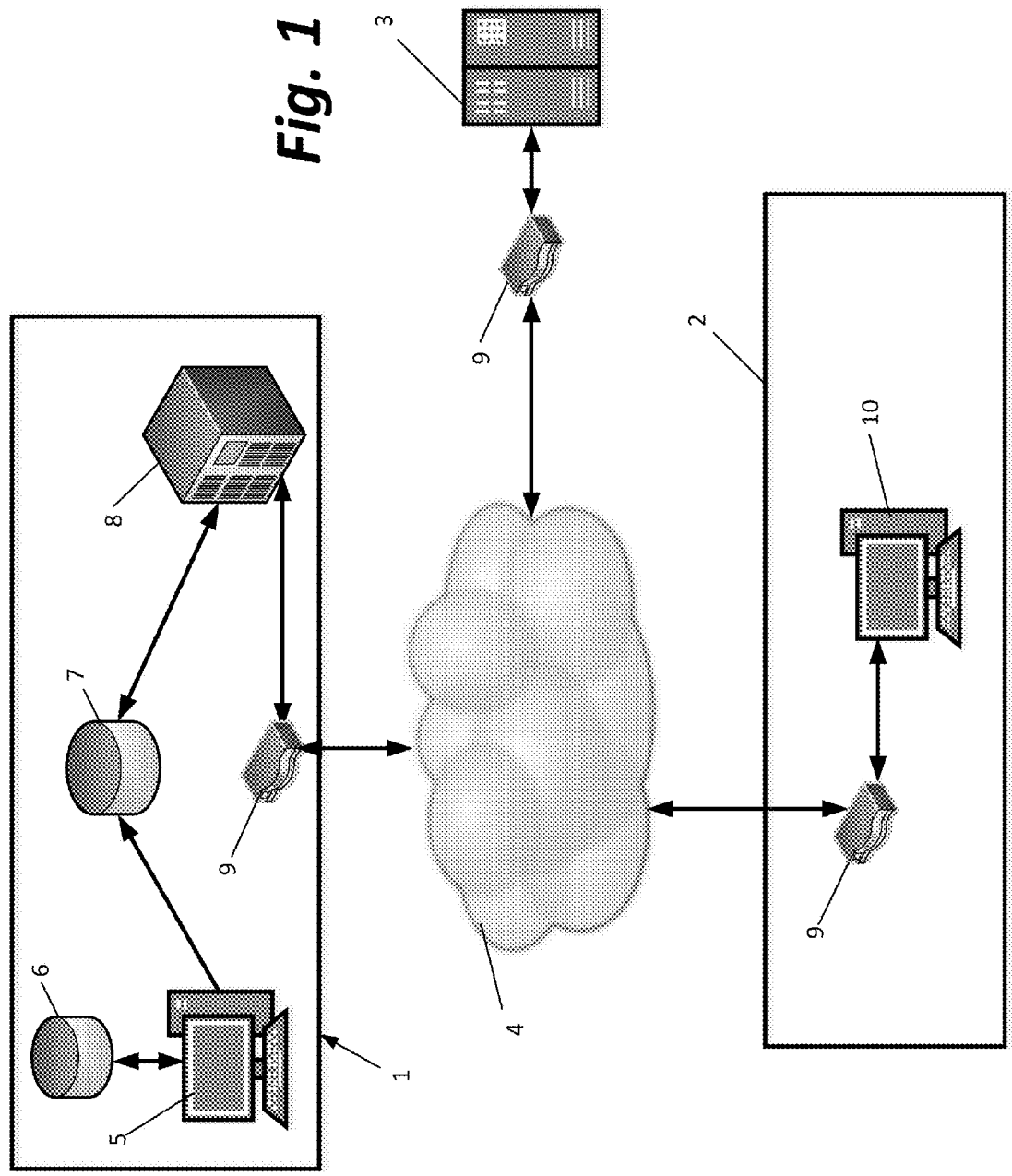
FIG. 1 is a schematic diagram illustrating a process carried out in accordance with the present invention to provide secure transmission of confidential data between two facilities.
Figure 2:
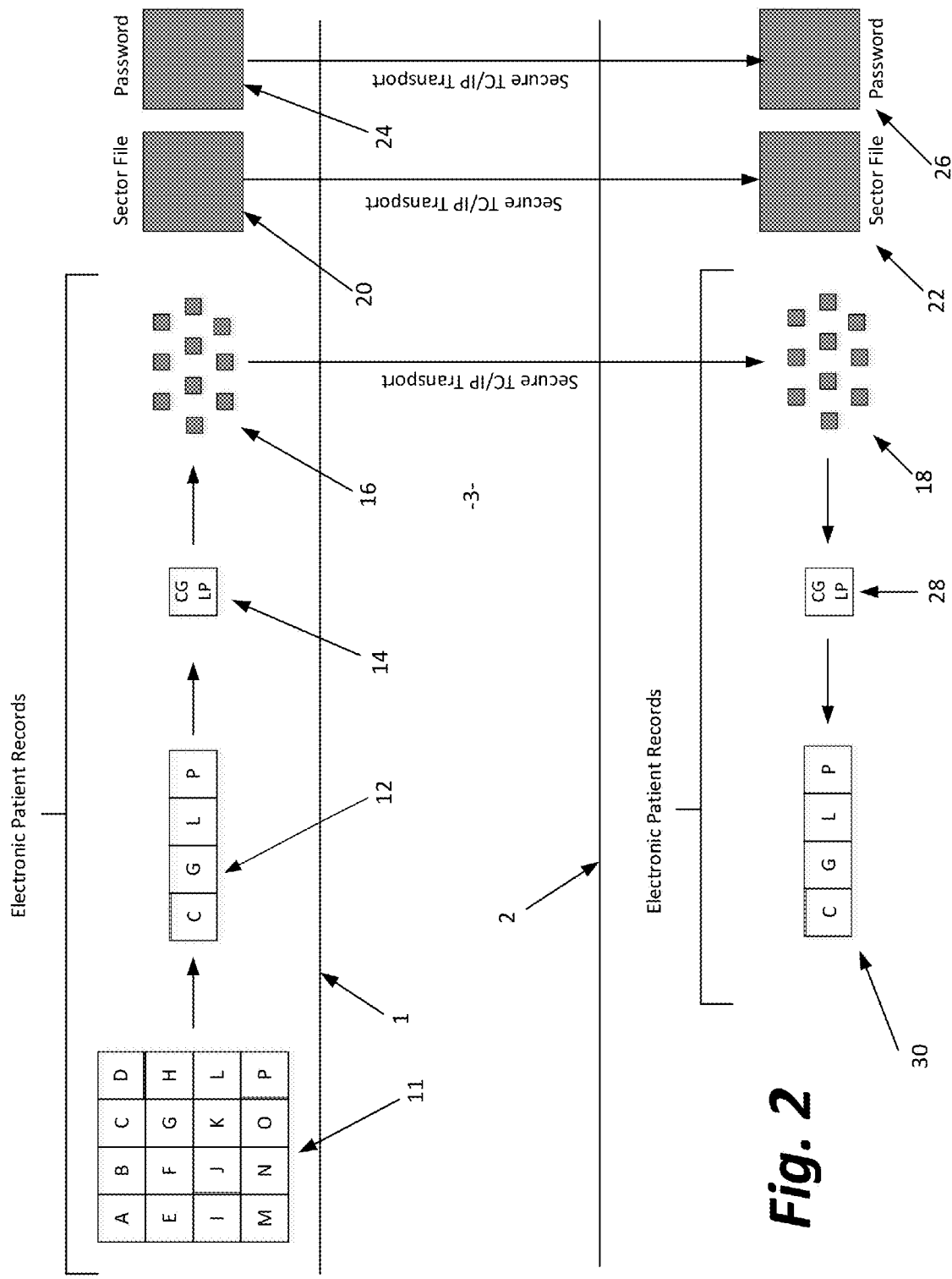
FIG. 2 is a schematic diagram illustrating equipment that may be employed to carry out the secure transmission of data between two facilities.

Referring to the drawings, a source facility having a first computer system 1 and a destination facility having a computer system 2 are shown in both FIGS. 1 and 2. The first computer system 1 at the source facility comprises at least one, but more typically, a plurality of computing devices. These include a computer storage device 6 that electronically stores a repository of confidential records. A computer (console) 5 is also located at the source facility and a part of computer system 1. Computer 5 is adapted to search the storage device 6 and select and retrieve records from storage device 6 based on search parameters entered by a user. Computer 5 is further adapted to create a copy of the selected and retrieved records and store the copy on a second storage device 7 of the first computer system 1. Alternatively, the computer 5 can instruct storage device 6 to send the selected records directly to storage device 7. A portal 8 is also located at the source facility and a part of the first computer system 1. Portal 8 is coupled by a modem 9 (i.e., any suitable routing device) to an external wide area network such as the internet 4.

Access to computer 5 is restricted. More specifically, the computer 5 is only available for use by an authorized user at the same physical location as computer 5. Any user of computer 5 will need to comply with security measures to use computer 5 to search the records stored on storage device 6. Such security measures may include entry of a user name and password, or entry of biometric information by way of a fingerprint, facial or retinal scan. Further, computer 5 is only able to write a copy of the selected records to storage 7. Computer 5 is entirely incapable of sending copies of any records anywhere else. More specifically, computer 5 is isolated via a secure firewall or by the absence of any external connection so that it is incapable of directly sending confidential records to devices outside of the source facility. Computer 5 is not coupled to the internet 4 either directly or via other equipment such as storage device 7, portal 8 or modem 9. This is desirable to isolate the data repository on storage device 6 to ensure the records stored on storage device 6 are not accessible to anyone other than authorized users or anyone not physically present at the source facility. While storage device 6 may be a single physical device, in most cases it will comprise an array of physical devices combined into a single logical unit for the purposes of data redundancy, performance improvement, or both.

Located at the destination facility is a second computer system 2 comprising a computer 10 coupled to the internet 4 by a modem 9 (i.e., any suitable routing device). As such, computer 10 can receive data and records sent to it by portal 8 via the internet 4. A cloud-based apparatus 3 also coupled to the internet 4 via a modem 9 facilitates secure communication between the portal 8 and computer 10, as described in further detail below.

In FIG. 2, the data stored on storage device 6 is represented by block 11. Block 11 shows sixteen pieces of confidential data which, for example, may be DICOM files related to various patients. Of course, modern storage devices can store vast numbers of files and are not limited to sixteen such files as shown for illustrative purposes.

When an authorized user wishes to transfer portions of the data, the authorized user enters search parameters into the computer 5. Computer 5 then retrieves copies of the responsive data files. In the example shown, the responsive data files are files C, G, L and P. The computer 11 then combines the selected data files and stores them as a first copy 12 on data storage 7. The computer system 1 at the source facility next compresses the copy 12 to create a compressed and encrypted copy 14. This compressed and encrypted copy 14 is then divided into encrypted chunked files 16 that are stored in storage device 7. These encryption steps are performed using a one-time random transaction password. A checksum is then run on each of the encrypted chunked files 16.

Two additional files are created by the computer system 1 at the source facility. The first file created is an encrypted sector file 20. Sector file 20 is also encrypted using the one-time random transaction password having a password bit size. The sector file includes such information as the bit size of the one-time random transaction password, a transaction protocol, a transaction type, an address associated with a component of the computer system at the source facility (most typically the address of the portal), the name of each chunked file and the checksum of each chunked file. The sector file 20 includes the instructions necessary to later reassemble the encrypted chunk files 16 into a second encrypted compressed file. The second file created is an encrypted password file 24 which contains the one-time random transaction password. Password file 24 is encrypted using a secure public key associated with the destination facility.

An application running on the computer 3, coupled to the internet via modem 9 (herein "modem" is used broadly and refers to any suitable routing device), facilitates transfer of files from the source facility's portal 8 to the receiving facility's computer 10. Computer 3 is typically under the control of a third-party security vendor. The application running on computer 3 performs several important functions.

First, when the portal 8 registers with the computer 3, a private key and a corresponding public key are created. The public key for portal 8 is sent to and stored on the computer 3. The computer 3, however, never has access to the private key for portal 8 which is retained exclusively on portal 8. Likewise, when computer 10 registers with computer 3, a private key and a corresponding public key are created. The public key for computer 10 is sent to and stored on the computer 3. The computer 3, however, never has access to the private key for computer 10 which is stored exclusively on computer 10. The public keys are never broadcast to a wider audience.

Second, when portal 8 has files to be transferred to the computer 10, portal 8 secures the public key for computer 10 from computer 3. This is the public key referenced above used to encrypt password file 24. All public key certificates are provided by computer 3. The files to be transferred between portal 8 and computer 10 are transferred directly peer-to-peer. Only the public keys are routed through the computer 3.

File transfer between portal 8 and computer 10 can occur in one of two ways. If the recipient (i.e., computer 10) has a public IP address, the portal 8 can push the files to computer 10. If the recipient does not have a public IP address, then the computer 10 pulls the files from portal 8. In this second scenario, the computer 10 needs to know when there are files ready for transfer. This information is provided by portal 8 sending a notification to computer 3 and computer 10 periodically polling the computer 3 to see if computer 3 has received any messages for computer 10. Again, computer 3 never gets a copy of the files to be transferred. Computer 3 only gets a message that there are files available for transfer.

After receiving and storing chunked files 18, the sector file 22 and password file 26, the computer 10 decrypts the password file using its private certificate (which must be matched to the public certificate that was used to encrypt the password file), decrypts the sector file 22 and chunked files 18 using the password stored in the password file 26, secures verification to process the chunked files, performs a checksum on each of the chunked files 18, compares the checksums for the chunked files 18 to the checksums stored in the sector file 22. If all match and the verification code has been received from computer 3, computer 10 combines the chunked files 18 into a single compressed binary file 28 based on the contents of sector file 22. If any of the chunked files are missing or damaged, computer 10 requests another copy of the missing or damaged chucked file(s) and receives those from the portal 8 before combining the chunked files. File 28 should be an exact copy of compressed binary file 14. File 28 is then decrypted using the password from the password file and decompressed back to the same format as file 12 to provide a copy 30 identical to file 12 and readable using the same software used to read file 12.

Now that the invention has been described in general terms, a specific implementation of the invention will be described with reference to FIG. 3.

Figure 3:
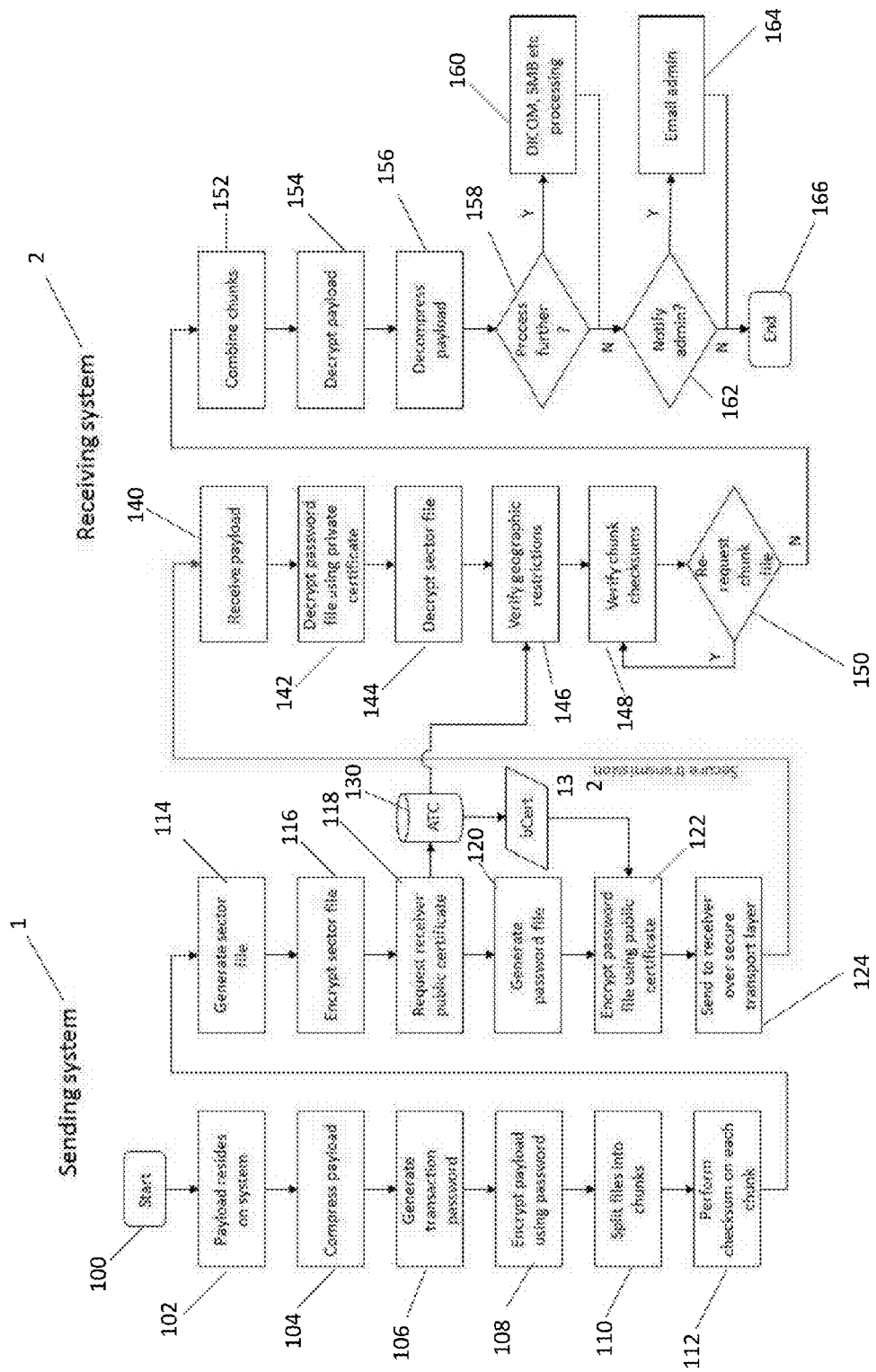
FIG. 3 is a flowchart illustrating in greater detail the steps of a representative method employed to achieve secure transmission of confidential electronic files from a source facility to a destination facility.

At step 100 in FIG. 3, an operator uses computer 5 to log into the sending computer system 1 at the sending location using either a user name and password, or biometric information such as a fingerprint, facial or retinal scan. The operator then enters a query to retrieve the records to be sent to computer system 2 at a destination facility. In this case, the query is a DICOM query/retrieve and the operator uses the graphical interface to select "remote query", complete a remote query screen (typically requesting a patient's last name, date of birth and sex) and then select from a list of patients corresponding to that query. The operator then submits a request for the specific records to be transmitted to the computer system 2 at the destination facility. Copies of the responsive records are transmitted to and stored on storage device 7 in FIG. 1 so that they are accessible by the portal appliance 8. At this point, step 102 has been completed because the payload (i.e., the records to be transferred) now reside on the record transfer system comprising storage device 7 and portal 8. In the example reflected in FIG. 3, the responsive records are stored on storage device 7 in a DICOM format.

At this point, multiple steps are performed by the computer system 1 to ready the payload for transmission to a remote facility's computer system 2 via portal 8. These steps provide multiple layers of security.

Specifically, in step 104, the payload is compressed. At step 106, a single-use random transaction password is generated. This password is used at step 108 to encrypt the compressed payload. The compression provides a first level of protection and the encryption of the compressed file provides a second level of protection.

A third level of protection is provided at step 110. At step 110, the compressed and encrypted file is split into encrypted chunks. These chunks are much like the pieces of a puzzle because the entire DICOM record cannot be viewed unless all the chunks are ultimately reassembled into the proper configuration. To assist in reassembly of the chunked files, at step 112 the system performs a checksum on each chunked file. A sector file is then generated at step 114. This sector file provides a roadmap for reassembly of the chunked files created at step 110. The sector file is encrypted at step 116 again using the one-time random transaction password.

Additional protection is provided by performing steps 118-122. Specifically, at step 118, the portal 8 requests a public certificate and this request is received at step 130 by the appliance 3. At step 120, the portal 8 generates a password file as the appliance 3 supplies the public certificate at step 132. The public certificate is then transmitted to the portal 8 and the portal 8 proceeds to encrypt the password file using the public certificate at step 122.

Only after all the layers of protection described above are in place, are files ready for transfer. Specifically, at step 124, each of the encrypted chunk files 16 generated at step 110, the encrypted sector file 20 generated at steps 114 and 116 and the encrypted password file 24 generated at steps 118-122 are transmitted via secure TCIP transports to the receiving system (computer 10 via the modem) at the destination facility.

Once these files reside on the computer 10, steps are employed to reassemble the chunked files, decompress the payload and make an exact duplicate copy of the payload in its native DICOM format.

Specifically, at step 142, the password file is decrypted using the required private certificate. Now that the password is known and available to the receiving system, computer 10 can decrypt the sector file 16, thereby exposing the roadmap required to put the chunked files back together. The computer 10 is only able to do so after receiving a verification code from the appliance 3 at step 146.

To ensure that computer 10 has all the pieces to the puzzle, (namely all the chunked files created at step 110) computer 10 performs its own checksum at step 148 of each of the chunked files and compares the checksum data generated with the checksum data contained in the sector file 22 that was decrypted at step 144. If any chunked files seem to be missing (or damaged), a request for those chunked files is sent from the computer 10 back to the portal 8 and the portal 8 can again forward those files to computer 10. This occurs at step 150.

Once it has been verified that the computer 10 has all the chunked files on hand, at step 152, the chunked files are combined to create an exact copy of the compressed and encrypted payload file created at steps 104-108. Using the password, this file is then decrypted at step 156. Recognizing that additional steps may be required to place the now decrypted and decompressed payload back into its original format, further processing is enabled at step 158. At step 160, the copy of the file is placed in the same format as the original file 12, for example, a DICOM or SMB format. Once steps 158 and 160 have been completed, the person responsible for facilitating the transfer is then notified at step 162. This notification occurs by the system automatically sending an e-mail to the administrator at step 146, thereby completing the process of transferring the files from the transmitting location to the receiving location at step 166. An instruction can also be sent to destroy the copy of the retrieved records stored on storage device 7 since that copy is no longer needed and storage device 7 is less secure than storage device 6. Such destruction can be performed by the administrator or automatically.

The present invention provides multiple levels of security to ensure private and secure transfer of data initially stored on storage device 6 to the computer 10. These levels of security include (a) compressing the payload, (b) encrypting the payload using a one-time password, (c) splitting the compressed and encrypted payload into a plurality of chunked files, (d) generating a separate sector file required to reassemble the chunks, (e) encrypting the sector file, (f) generating a separate password file, and (g) encrypting the password file. To gain access to the transferred private data, the receiving system must receive each of the chunked files, the sector file and the password file, as well as verification codes from the appliance 3. The recipient must also have the private key (certificate) required to decrypt the password file. The data contained in the original payload is unavailable to anyone who does not have each separate file, the verification, and the private key required to decrypt the password file. These multiple layers of protection are highly effective in preventing security breaches that would allow unauthorized access to the information that is contained in the payload even though these files are transferred over a public network such as the internet.

Still another advantage of the present invention is that it enables a user to cheaply and efficiently transfer such payloads in a secure fashion to any recipient selected from a group of recipients. All of this is accomplished using standard hardware typically available at any recipient's location. The only special equipment that is required is the portal 8 at the source facility and the appliance 3 operated by, for example, a vendor in the business of ensuring secure communications between sending and receiving facilities. The software applications that must be installed on the sender's computer system 1 and the receiving facilities' computer 10 are simple, inexpensive and easy to reproduce once the software is written.

While systems of this type are highly advantageous when employed to transfer medical records between hospitals and clinics, particularly when those records are imaging records stored in a DICOM format, the invention may also be employed to send virtually any other type of file in a very private and secure manner. The invention is also advantageously employed to transfer documents related to non-destructive testing which are often stored as DICONDE imaging files. The invention also enables the use of standard file transport protocols such as FTP, SFTP and FTPS. Likewise, notifications can be sent using standard messaging protocols such as SMTP or SMS. Other transmission can occur using standard delivery methods such as SFTP, RSINK over SSH or HTTP. The delivery method used will depend on the firewall settings at the facilities between which the transfer is taking place.

Of course, secure two-way transfer of files is possible between the facilities in which case the sender becomes the recipient and the recipient becomes the sender. In such cases, both facilities may be equipped with computer systems like computer system 1.

Also, because all public key certificates are provided by computer 3, computer 3 can be used to create and transmit reports showing where confidential data has been sent and when. Further, computer 3 may be employed to ensure that no confidential data is transferred across geographic boarders in violation of governmental regulations such as this imposed by the Health Insurance Portability and Accountability Act (HIPPA).

The foregoing description is intended to explain the various features and advantages of the present invention, but is not intended to be limiting. The scope of the invention is defined by the following claims which are also intended to cover a reasonable range of equivalents.

What is claimed is:

1. For securely transferring confidential electronic records from a first computer system at a source facility to a second computer system at a destination facility, a method comprising:

(a) employing the first computer system to select confidential electronic records to be sent from the source facility to the destination facility and select parameters to be employed to secure and control the transfer of the selected confidential electronic records;

(b) creating a copy of the selected confidential electronic records and storing the copy on a local storage device;

(c) compressing the copy into a single encrypted binary file using a one-time random transaction password having a password bit size, splitting the single binary file into a plurality of encrypted chunked files using a one-time random transaction password and performing a checksum for each of said plurality of encrypted chunked files;

(d) creating an encrypted sector file using the one-time random transaction password, the encrypted sector file comprising the password bit size, a transaction protocol, a transaction type, an address of the first computer, the name of each chunked file and the checksum of each chunked file;

(e) storing the one-time random transaction password in a password file and encrypting the password file using a public certificate associated with the destination facility; and (g) sending the encrypted chunked files, the encrypted password file and the encrypted sector file from the first computer system to a second computer system at a destination facility.

2. The method of claim 1 wherein the second computer system, after receiving the encrypted chunked files and the encrypted sector file and the encrypted password file, decrypts the encrypted password file using a private certificate, decrypts the encrypted sector file and the encrypted chunked files using the one-time random transaction password, secures verification to process the chunked files, performs a checksum on the chunked files and compares the checksums for the chunked files to the checksum in the sector file to determine whether all of the chunked files have been received and none are damaged, combines the chunked files into a single encrypted binary file, decrypts the single encrypted binary file using the one-time random transaction password and decompresses the decrypted binary file back to the same format as the copy to create a second copy on the second computer system.

3. The method of claim 1 wherein said first computer system comprises a console accessible to authorized internal staff only and a portal adapted to communicate with the second computer system via the internet.

4. The method of claim 3 wherein the local storage device is accessible by the computer portal.

5. The method of claim 1 wherein a secure TCP/IP transport mechanism is employed to send the encrypted chunked files, the encrypted password file and the encrypted sector file from the first computer system at the source facility to the second computer system at the destination facility.

6. The method of claim 5 wherein a cloud-based service provides the public certificate associated with the destination facility to the first computer system.

7. The method of claim 2 wherein a verification code must be received by the second computer system to enable the second computer system to perform at least one of the steps recited in claim 2.

8. The method of claim 1 wherein the confidential electronic records are patient records and are selected using a DICOM query.

9. The method of claim 1 wherein said parameters comprise the email address of at least one administrator.

10. The method of claim 8 wherein the copy of the selected confidential records is stored in at least one file conforming to the standard DICOM standard.

11. The method of claim 2 further including the step of notifying at least one administrator via email that the secure transfer has been completed.

12. An apparatus for securely transferring confidential electronic records from a source facility to a destination facility comprising:

(a) a first computer system located at a source facility and comprising a console, a first local storage device adapted to store in a searchable fashion confidential files, a second local storage device, and a portal able to transmit and receive data via the internet, said console adapted to (i) restrict access to the confidential files to authorized personnel, (ii) select confidential files to be sent from the source facility to a destination facility, (iii) select parameters to be employed to secure and control the transfer of selected confidential files, (iv) create a first copy of selected confidential files and store the first copy on the second local storage device, said first computer system further adapted to (i) compress the first copy into a single binary file and encrypt the file using a one-time random transaction password having a password bit size, (ii) split the single encrypted binary file into a plurality of chunked files, encrypt the file using a one-time random transaction password and performing a checksum for each of said plurality of chunked files, (iii) create a sector file and encrypt the sector file using a one-time random transaction password, the encrypted sector file comprising the password bit size, a transaction protocol, a transaction type, an address of at least one of the portal and the console, the name of each encrypted chunked file, and the checksum of each encrypted chunked file, and (iv) create a password file containing the one-time random transaction password and encrypt the password file using a public certificate associated with the destination facility, said portal further adapted to transmit the encrypted chunk files, the encrypted sector files, and the encrypted password file over a secure transport mechanism;

(b) a second computer system located at a destination facility adapted to receive the encrypted chunked files, the encrypted sector file and the encrypted password file, decrypt the password file using a private certificate, decrypt the sector file and encrypted chunked files using the one-time random transaction password, secure a verification required to further process the encrypted chunked files, perform a checksum on the chunked files and compare the checksums for the chunked files to the checksums in the sector file, combine the chunked files into a single encrypted binary file, decrypt the single encrypted binary file using the one-time random transaction password, and decompress the decrypted binary file back to the same format as the copy to create and store a second copy on the second computer system; and (c) a cloud-based apparatus adapted to provide the first computer system with the public certificate used to encrypt the password file, and the verification.

* * * * *